United States Patent [19]

Tanigaki

[11] 4,259,669

[45] Mar. 31, 1981

[54] DETECTION SYSTEM

[75] Inventor: Hidetoshi Tanigaki, Kobe, Japan

[73] Assignee: Furuno Electric Co. Ltd., Hyogo, Japan

[21] Appl. No.: 80,951

[22] Filed: Oct. 1, 1979

[30] Foreign Application Priority Data

Oct. 6, 1978 [JP] Japan .................. 53-138221[U]
Nov. 17, 1978 [JP] Japan .................. 53-142697

[51] Int. Cl.³ .................................... G01S 7/22
[52] U.S. Cl. ..................... 343/5 EM; 343/5 ST
[58] Field of Search ............... 343/5 EM, 5 ST

[56] References Cited

U.S. PATENT DOCUMENTS

| 2,697,827 | 12/1954 | Whitaker | 343/5 EM X |
| 2,742,637 | 4/1956 | Braddon et al. | 343/5 EM |
| 3,697,987 | 10/1972 | Arthur | 343/5 EM |
| 4,077,037 | 2/1978 | Bryden | 343/5 EM |

*Primary Examiner*—T. H. Tubbesing
*Attorney, Agent, or Firm*—Jordan and Hamburg

[57] ABSTRACT

In a radar system with a plan position indicator, deflecting coil rotation is synchronized with antenna rotation by developing a train of pulses related to antenna rotation for driving a pulse motor controlling coil rotation. Synchronization is achieved by producing a pulse upon a predetermined displacement of the antenna.

16 Claims, 9 Drawing Figures

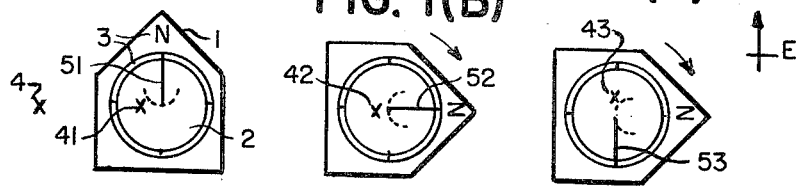
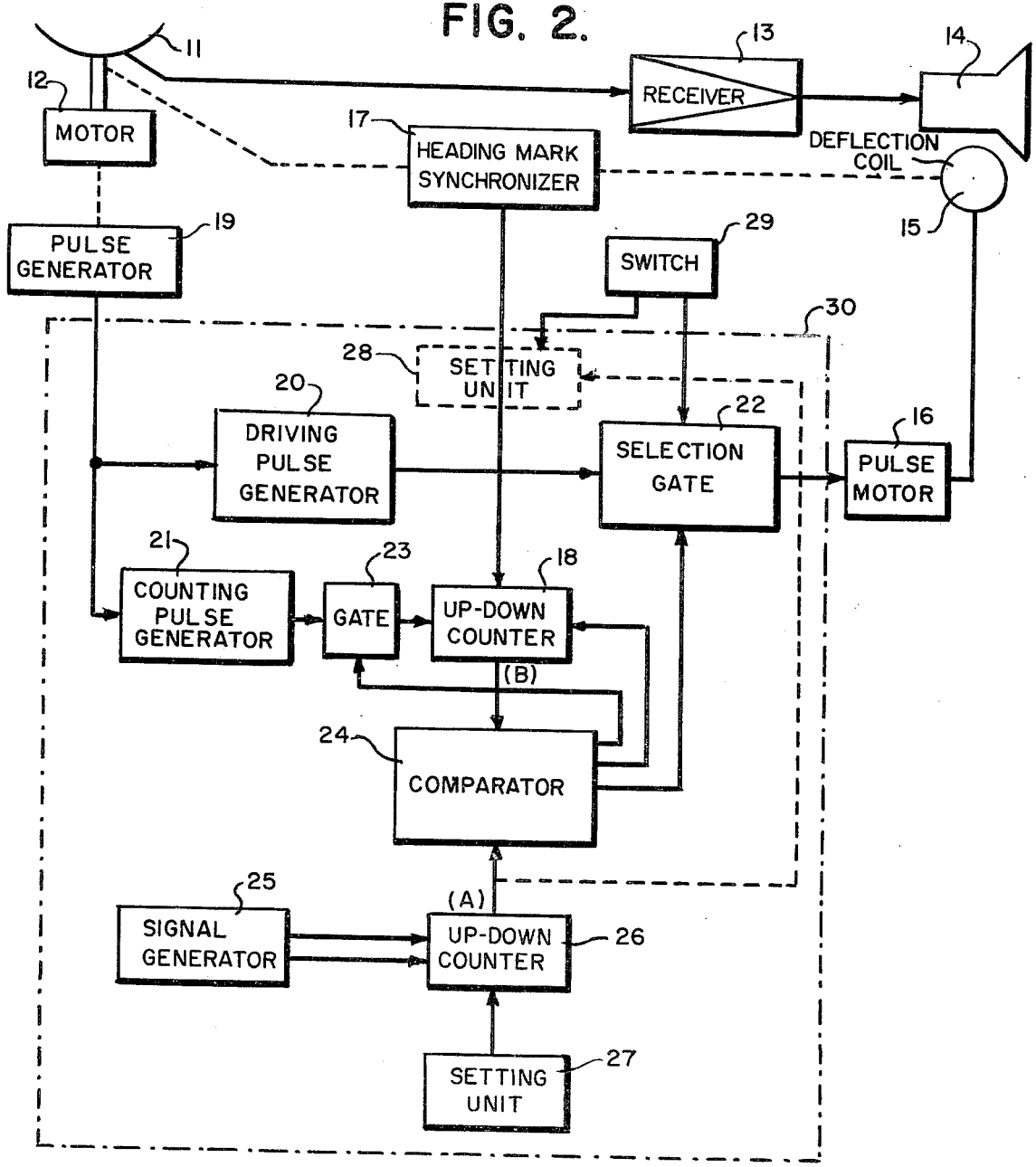

DETECTION SYSTEM

BACKGROUND OF THE INVENTION

This invention relates to a detection system which displays conditions of the surrounding area to be observed, and a radial reference marker, on the face of a cathode-ray tube in a form of plan position indication. More particularly, it relates to an indicating apparatus of the detection system which can display a radial reference marker in any direction on the face of the cathode-ray tube.

A detection system transmits search pulses from a transmitting and receiving unit rotated at constant speed in synchronism with the rotation of a deflection coil around the neck of a cathode-ray tube, and supplies received echo signals and a bearing signal generated when the transmitting and receiving unit points in a predetermined direction for the intensity control input of the cathode-ray tube. The deflection coil is adapted to successively deflect the electron beam to make radial sweeps in different directions one after another over the screen of the cathode-ray tube in synchronism with each transmission of a search pulse. Hence, the cathode-ray tube displays bright spots at corresponding places and a radial bright line in a corresponding direction thereover. The indicating apparatus of the detection system controls the advance or delay of the phase of the deflection coil with respect to that of the transmitting and receiving unit by increasing or decreasing the rotating speed of the deflection coil, so that a reference marker can be displayed in any direction.

The invention has particular application in radar systems which rotate the deflection coil of a cathode-ray tube at constant speed in synchronism with the rotation of the antenna scanner, and change, if necessary, the rotating speed of the deflection coil with respect to that of the antenna scanner by utilizing bearing signals supplied from a gyro compass. It can also be applied in the sonar class devices which have a rotatable transmitting and receiving ultrasonic transducer, and a cathode-ray tube around the neck of which a deflection coil is mounted and rotated in synchronism with the rotation of the ultrasonic transducer.

Hereinafter, the invention will be explained as embodied in a shipborne radar system although as explained above the invention is not limited to that particular system.

In an indicating apparatus of a ship mounted radar system, such well-known methods of presenting an image of the surrounding area to be observed over the face of a cathode-ray tube have been proposed as, for example: (1) relative display in "Ship's head up", (2) stabilized display in "North-up stabilized" and (3) stabilized display in "Ship's head up". With a relative display in "Ship's head up", a heading marker showing the direction of a ship's head always points upward (0°). When the ship changes its course, the image turns but the heading marker remains in the same position pointing in the direction of 0° on the scale fixed around the periphery of the face of a cathode-ray tube. The deflection coil of the cathode-ray tube is made to rotate in synchronism with the antenna scanner. With a stabilized display in "North-up stabilized", the picture of the area represented remains in the same position, irrespective of any changes of course by the ship, but the heading marker moves accordingly in a clockwise or an anticlockwise direction. The deflection coil of the cathode-ray tube is controlled to change its phase relationship with the antenna scanner by utilizing bearing signals supplied from a gyro compass. A true bearing of the ship's head can be read from the heading marker and the fixed scale. With a stabilized display in "Ship's head up", the picture of the area remains in the same position but the heading marker moves with the yawing of the ship. Bearing signals produced from a gyro compass are also utilized to change the rotating speed of the deflection coil with respect to the antenna, thereby moving only the heading marker. A relative bearing of the ship's head with respect to the direction the ship was proceeding when switched to the stabilized display in "Ship's head up" can be read from the heading marker and the fixed scale.

In a prior art indicating apparatus of a radar equipment, a servomechanism has been utilized to rotate the deflection coil of a cathode-ray tube in synchronism with the rotation of the antenna and to control the amount of the phase difference between the two rotating members, thus presenting both a relative display in "Ship's head up" and a stabilized display in "North-up". Such an apparatus, however, cannot present a stabilized display in "Ship's head up" in addition to the other two methods of display, and moreover requires a synchro transmitter, a synchro receiver, a synchro differential transmitter and a servomotor, thus making the apparatus bulky and costly.

BRIEF DESCRIPTION OF THE INVENTION

Accordingly, an object of the present invention is to provide an indicating apparatus of a radar system which can present both a relative display in "Ship's head up" and a stabilized display in "North-up", and which can be digitally controlled and is compactly constructed.

Another object of the present invention is to provide an indicating apparatus of a radar system which can electrically automatically present any one of a relative display in "Ship's head up", a stabilized display in "North-up" and a stabilized display in "Ship's head up", and selectively present any one of the three methods of display.

Another object of the present invention is to provide an indicating apparatus of a radar system which can automatically present either a stabilized display in "North-up" or a stabilized display in "Ship's heads up", irrespective of connection or disconnection of the indicating apparatus to power mains.

Another object of the present invention is to provide an indicating apparatus of a radar system which can automatically establish phase coincidence between the deflection coil and the antenna scanner, at most within one revolution of the antenna scanner.

Another object of the present invention is to provide an indicating apparatus of a radar system which can improve resolution in moving a radial reference marker exactly to a predetermined position.

Another object of the present invention is to provide an indicating apparatus of sonar class devices which can present both a relative display in "Ship's head up" and a stabilized display in "North-up", and can be digitally controlled.

In order to achieve the above objectives, in accordance with one aspect of the present invention, an indicating apparatus of a detection system is defined for displaying, on the face of a cathode-ray tube, the echo signals caused by search pulses transmitted successively in different directions from a transmitting and receiving unit rotated at constant speed, and returned from obstacles, and a mark signal produced when the transmitting and receiving unit points in a predetermined direction, thereby displaying an image of the surrounding area and a radial reference marker thereon in a form of plan position indication. The indicating apparatus includes (i) deflecting means positioned around the neck of the cathode-ray tube and rotated about an axis thereof, for deflecting the electron beam thereof, (ii) a rotating shaft for rotating the transmitting and receiving unit in a horizontal plane at constant speed, (iii) phase aligning means for bringing the phase of said deflecting means into alignment with that of said rotating shaft and for producing an output signal when said deflecting means and the rotating shaft are brought into phase coincidence with each other, (iv) a pulse motor for rotating said deflecting means, (v) pulse generating means for producing a sequence of pulses in association with the rotation of said rotating shaft, (vi) first comparison signal generating means for storing a predetermined numerical value corresponding to the angle formed by a ship's heading direction with a reference bearing and for producing a value obtained by an addition (or a subtraction) operation performed with the change of the ship's course, (vii) second comparison signal generating means for storing a specific numerical value set thereinto by the output signal supplied from said phase aligning means and for producing a resulting value obtained by an addition (or a subtraction) operation performed based on the sequence of pulses supplied from said pulse generating means, (viii) comparing means for comparing the output values from said first and second comparison signal generating means with each other to produce resulting output signals, and (ix) driving pulse generating means for producing a plurality of sequences of pulses respectively with different frequencies to be used for driving said pulse motor and for selecting a sequence of pulses with a desired frequency based on a corresponding output signal from said comparing means and supplying them to said pulse motor.

Other objects and features of the present invention will be described in more detail herein with reference to accompanying drawings.

BRIEF DESCRIPTION OF THE DRAWINGS

FIGS. 1A–1C are explanatory diagrams for explaining the relationship between the display over the face of the cathode-ray tube of a ship-mounted radar equipment and targets in the surrounding area, FIG. 1(A) and FIG. 1(B) being diagrams of a relative display in "Ship's head up" and FIG. 1(C) is a diagram of a stabilized display in "North-up";

FIG. 2 is a schematic block diagram of an indicating apparatus of a ship-mounted radar equipment according to an embodiment of the present invention;

Throughout the drawings, the same reference numerals are given to like components, and the same alphabetic reference designations are given to like signals or elements.

DETAILED DESCRIPTION OF A PREFERRED EMBODIMENT

Figure 3:
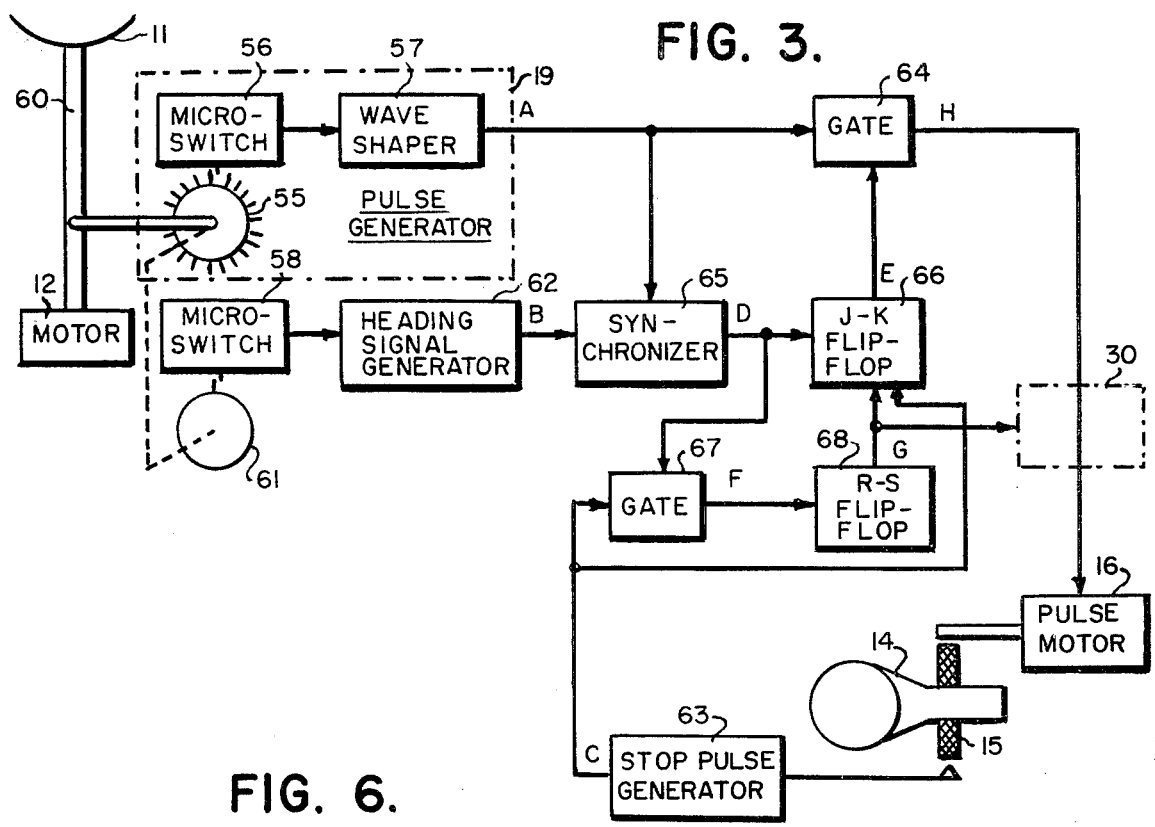
FIG. 3 is a schematic block diagram of a portion of a variation of the indicating apparatus of a radar system according to FIG. 2, presenting a relative display in "Ship's head up" according to another embodiment of the present invention, which particularly includes the heading mark synchronizer used in the embodiment of the present invention illustrated in FIG. 2.

Referring to FIG. 1(A), it is assumed that a ship equipped with a radar system is proceeding in a bearing of the north and a relative display in "Ship's head up" is presented on the face of the cathode-ray tube. A radial reference marker (heading marker) 51 and a target signal 41 returned from a nearby ship 4 existing in the west are respectively displayed on the face 2 of the cathode-ray tube (CRT) indicator of the radar equipment. The antenna of the radar is symbolically represented by a dotted arc indicating the pointing direction thereof in the central part of the face of the CRT, around the periphery of which a bearing scale 3 is fixed with 0° in line with the ship's heading direction.

In ship-mounted radars, the direction of the electron beam of a CRT swept radially and successively in different directions is adapted to coincide with the pointing direction of an antenna. With a relative display in "Ship's head up", the heading marker always appears at 12 o'clock position irrespective of the bearing along which the ship proceeds, since a direction signal is applied to the brightness modulation input of the CRT when the antenna points in the heading direction of the ship.

Turning now the ship toward the right by 90 degrees to the east, the heading marker is still brightened in the heading direction of the ship, and the target signal is indicated on the left side to the center of the face of the CRT. As a consequence, the relative bearing of the target signal with respect to the heading marker can be read off, but a true bearing of the target signal is not known. If a true bearing of the target signal with respect to the ship must be obtained, the rotating speed of the deflection coil of the CRT must be increased so that the phase difference between the deflection coil and the antenna becomes 90 degrees and thus the display as shown in FIG. 1(C) is presented. The heading marker 53 is indicated in a downward direction and the target signal 43 is indicated in an upward direction of the center of the face of the CRT. With the north (0°) maintained in the ship's heading direction, the bearings of the heading marker and the target signal are therefore respectively the east and the west. Thus a true bearing of the target signal with respect to the ship is measured.

Referring to FIG. 2, an antenna 11 is rotated at constant speed by a motor 12. The antenna 11 successively transmits search pulses in different directions and receives echo signals from obstacles to be supplied through a receiver 13 to the intensity modulation input of a cathode-ray tube 14. A deflection coil 15 is positioned to surround the neck of the CRT 14 and is driven by a pulse motor 16 to rotate about an axis thereof. A heading mark synchronizer 17 synchronizes the deflection coil 15 with the rotation of the antenna 11 in such a way that a heading marker is radially displayed at 12 o'clock position on the face of the CRT, and transmits a pulse to an up-down counter 18 when the phase of the deflection coil 15 is brought into coincidence with that of the antenna 11. The construction of the heading mark synchronizer 17 will be explained in detail later.

A pulse generator 19 produces a sequence of pulses with a frequency f, for example 360 pulses for each complete rotation of the antenna 11. The construction of the pulse generator 19 is, by way of example, as shown in FIG. 3. It comprises a rotatable disk 55 having a plurality of needles fixed at the same spacing intervals around the periphery thereof and being fixedly coupled to a rotating shaft 60 of the antenna 11, an electric microswitch 56 being mounted close to the disk 55 and switched on by each of the needles when struck to produce a train of pulses. A waveform shaper 57 shapes the pulses into a suitable waveform. The pulse generator 19 transmits these generated pulses to a driving pulse generator 20 and a counting pulse generator 21. The construction of the driving pulse generator 19 will be explained in detail later. The driving pulse generator 20 functions to produce, by way of example, three kinds of sequences of pulses with respective frequencies f, 4/3 f and 2/3 f to a selection gate 22. The counting pulse generator 21 produces a sequence of pulses with a frequency 1/3 based on the output signals from the pulse generator 19 and supplies them via a gate 23 to the up-down counter 18. The up-down counter 18 is set to store a numerical value of zero by the pulse received from the heading mark synchronizer 17 and performs either an addition or a subtraction operation in accordance with direction signals supplied from a comparator 24 and each time a counting pulse is supplied from the counting pulse generator 21, and provides a counted numerical value with one input of the comparator 24. A signal generator 25 may comprise a gyro repeater and a synchro-digital converter in series connected, and functions to produce a pulse when the ship changes its proceeding direction, for example by one degree, to a clock input of up-down counter 26 to simultaneously provide a direction signal representing a changing direction of the ship's head with a control input of the up-down counter 26. The up-down counter 26 may be set to an initial predetermined value by setting unit 27 to store a numerical value corresponding to the angle made by the ship's proceeding direction with a bearing of the north, and performs either an addition or a subtraction operation in accordance with the direction signal applied to the control input thereof each time a pulse is applied to the clock input thereof. The addition or subtraction operation is performed in such a way that the addition operation is performed when the ship changes its heading direction to the right, and the subtraction is made when the ship changes its proceeding direction to the left. The comparator 24 compares the numerical value supplied by the up-down counter 26 with the one from the up-down counter 18 and transmits three kinds of signals to the control input of the selection gate 22 and direction signals to the control input of the up-down counter 18 and a control signal to the control input of the gate 23. It is assumed here that the numerical value stored in the up-down counter 26 is represented as A and the one stored in the counter 18 is represented as B. If the relationship is $A = B$, the comparator 24 applies a first control signal to the control input of the selection gate 22 to make it pass a sequence of pulses with its frequency f as for example 360 pulses per revolution of the antenna 11 produced by the driving pulse generator 20 to the pulse motor 16, thereby rotating the deflection coil 15 in synchronism with the antenna scanner. The comparator 24 simultaneously applies a control signal to the gate 23 to interrupt the flow of the sequence of pulses from the counting pulse generator 21. If the relationship therebetween is $A > B$, the comparator 24 provides a second control signal with the selection gate 22 to make it pass 480 pulses per revolution of the antenna 11 from the driving pulse generator 20 to the pulse motor 16, thereby increasing the rotating speed of the deflection coil and thus increasing the phase difference between the deflection coil 15 and the antenna 11 and moving the heading marker in a clockwise direction on the face of the cathode-ray tube. The gate 23 is opened by the control signal supplied from the comparator 24 during the period the relationship $A > B$ is maintained, and is closed when the relationship $A = B$ is reached, in other words the heading marker is moved to the position corresponding to a true bearing of the ship's heading direction. If the relationship is $A < B$, the comparator 24 transmits a third control signal to the selection gate 22 to make it pass 240 pulses per revolution of the antenna to the pulse motor 16, thereby decreasing the rotating speed of the deflection coil and thus increasing the phase difference in the opposite direction and moving the heading marker in an anti-clockwise direction. The selection gate 22 is constructed as to pass a sequence of driving pulses with a frequency f to the pulse motor 16, when a switch 29 is connected to a position of a relative display in "Ship's head up", and to pass one of the sequences f, 4/3 f and 2/3 f thereto, when the switch 29 is alternatively connected to a position of either a stabilized display in "North-up stabilized" or a stabilized display in "Ship's head up".

In operation, it is assumed that the ship proceeds in a true bearing of the north as shown in FIG. 1(A). The reversible counter 26 is set to store the predetermined numerical value of zero by the initial value setting unit 27. The heading mark synchronizer 17 transmits a setting signal to the reversible counter 18 to set a numerical value of zero thereinto at the moment the deflection coil 15 is brought to phase coincidence with the antenna 11 and thus the heading marker is indicated at 12 o'clock position on the face of the PPI indicator. As a result, the relationship between the numerical values stored respectively in the two reversible counters becomes $A = B$, and hence the first control signal from the comparator 24 is transmitted to the selection gate 22 to let it pass 360 pulses per revolution of the antenna 11 from the driving pulse generator 20 to the pulse motor 16, thereby rotating the deflection coil 15 in synchronism with the rotation of the antenna 11. The heading marker and the return signal are respectively displayed as shown in FIG. 1(A).

If the ship turns to the right (the east), as shown in FIG. 1(B) or FIG. 1(C), a sequence of pulses from the signal generator 25 are successively supplied to the up-down counter 26, with the result that the relationship becomes $A > B$ and hence the second control signal from the comparator 24 is applied to the selection gate 22 to let it pass 480 pulses to the pulse motor 16, thereby increasing the rotating speed of the deflection coil 15 and thus moving the heading marker in a clockwise direction. With the ship's proceeding direction maintained in a bearing of the east, the heading marker and the target signal are respectively displayed as shown in FIG. 1(C). Until the relationship A=B is reached, the gate 23 is opened by the comparator 24 to supply the counting pulses from the counting pulse generator 21 to the up-down counter 18.

Next, assume that the ship first proceeds with a true bearing of 45 degrees with respect to the north, and then gradually changes its heading direction toward the left. A numerical value of 45 is first stored in both the up-down counters 26 and 18. With a gradual change of the ship's head toward left, the numerical value stored in the up-down counter 26 is successively subtracted each time a counting pulse from the signal generator 25 is supplied thereto, with the result that the resulting relationship of the comparision performed in the comparator 24 becomes A<B. The comparator 24 couples the third control signal to the selection gate 22 to let it pass a sequence of pulses with a frequency 2/3 f to the pulse motor 16, thereby decreasing the rotating speed of the deflection coil 15 and thus moving the heading marker in an anti-clockwise direction. The gate 23 is opened by the comparator 24, until the relationship A=B is reached.

A stabilized display in "Ship's head up" is presented by interposing a setting unit 28 represented in dotted lines between the heading mark synchronizer 17 and the up-down counter 18 in FIG. 2. The heading mark synchronizer 17 transmits a signal to the setting unit 28 to make it set into the up-down counter 18 the same numerical value as the one kept in the up-down counter 26. As easily anticipated, only the heading marker moves with target signals staying at the same places on the face of the CRT, in proportion to the horizontal change of the ship's heading direction. A switch 29 is connected to enable the setting unit 28 to pass a pulse from the heading mark synchronizer 17 directly to the up-down counter 18 when a stabilized display in "North-up stabilized" is selected to thereby set the counter 18 to zero. The switch 29 further controls the up-down counter 18 to be set by the output of the synchronizer 17 to the same numerical value as the one kept in the up-down counter 26 under the control of the setting unit 27, when a stabilized display in "Ship's head up" is selected. The switch 29 controls the selection gate 22 so that it passes only the sequence of driving pulses having a frequency f to the pulse motor 16 when a relative display in "Ship's head up" is selected. In the latter case the counter 18 is of course set to zero by the output of synchronizer 17.

It may happen that the signal generator 25 and the up-down counter 26 are connected to a different power source than the source supplying electric power to the rest of the indicating apparatus of the radar system and are maintained operative even when the rest of the radar installation is switched off. Such an indicating apparatus of a radar system can automatically present either a stabilized display in "North-up stabilized" or a stabilized display in "Ship's head up" without operating the initial value setting unit 27, even when the indicating apparatus is operated intermittently.

Referring to FIG. 3, the antenna 11 is connected by a shaft 60 to the motor 12 and is rotated at constant speed thereby. The rotatable disk 55 constituting the pulse generator 19 and another rotatable disk 61 having a needle at the periphery thereof are respectively fixedly coupled to the shaft 60. The pulse generator 19 also includes the electric microswitch 56 and the waveform shaper 57 and operates to transmit a sequence of pulses (waveform A of FIG. 4), for example 360 pulses per revolution of the antenna 11, to one input of a gate 64 and a pulse synchronizer 65. The needle of the rotatable disk 61 is adapted to strike the electric microswitch 58 when the antenna points in the ship's heading direction. A heading signal generator 62 shapes the waveform of the output signal generated by the microswitch 58 to produce a well-shaped heading signal (waveform B of FIG. 4) to the other input of the pulse synchronizer 65. The pulse synchronizer 65 may be composed of two flip-flop circuits, and operates to synchronize the heading signal (waveform B of FIG. 4) with the sequence of pulses (waveform A of FIG. 4) from the pulse generator 19 and to produce a synchronizing pulse (waveform D of FIG. 4) with its pulse length equal to one period of the sequence of pulses (waveform A of FIG. 4) to the preset input of a J-K flip-flop circuit 66 and to the control input of a gate 67. The pulse motor 16 is driven by the pulses (waveform A of FIG. 4) supplied thereto through the gate 64. A stop pulse generator 63 produces a stop pulse (waveform C of FIG. 4) when the electron beam is controlled by the deflection coil 15 to sweep in the direction of 12 o'clock on the face of the cathode-ray tube, and transmits it to an input of the gate 67 and to the clock input of the J-K flip-flop circuit 66. The gate 67 passes the transformed stop pulse (FIG. 4F) to the input of R-S flip-flop circuit 68 during the period the synchronizing pulse (waveform D of FIG. 4) is applied thereto. The R-S flip-flop circuit 68 produces a high-level output signal when the radar equipment is switched on, and produces a low-level signal when a pulse is applied thereto from the gate 67. The output of the R-S flip-flop circuit 68 is connected respectively to the J-K input of the J-K flip-flop circuit 66 and the heading mark synchronizer 17. The J-K flip-flop circuit 66 is reset by a stop pulse (waveform C of FIG. 4) from the stop pulse generator 63 applied to the clock input thereof to produce a low-level output signal to the control input of the gate 64, and is set by a rising edge of synchronizing signals (waveform D of FIG. 4) applied to the preset input terminal thereof to produce a high-level output signal to the control input of the gate 64, thereby passing the sequence of pulses (waveform H of FIG. 4) to the pulse motor 16. The J-K flip-flop circuit 66 also functions to continuously produce a high-level output signal to the gate 64 during the period a low-level signal is applied to its J-K input thereof, even when a stop pulse (waveform C of FIG. 4) is applied to its clock input, thereby passing the sequence of pulses (waveform H of FIG. 4) from the pulse generator 19 and continuously rotating it.

In operation, the antenna 11 and the deflection coil 16 begin to rotate when the radar installation is connected to power sources. Under initial conditions, J-K flip-flop circuit 66 is reset to produce a low-level output signal when the stop pulse 70 is generated, since a high-level signal is continuously applied to its J-K input thereof. The low-level output signal (waveform E of FIG. 4) from the flip-flop circuit 66 controls the gate 64 to interrupt the flow of driving pulses, thereby stopping the deflection coil 15. But the antenna 11 continues to rotate, and thus the heading signal 71 (waveform B of FIG. 4) and the sequence of pulses (waveform A of FIG. 4) are respectively produced and applied to the pulse synchronizer 65. Hence, the synchronizing pulse 72 is produced by the pulse synchronizer 65 and is applied to the preset input of the flip-flop circuit 66 to make it provide a high-level output signal with the gate 64, thereby passing the driving pulses to the pulse motor 16 to start the rotation of the deflection coil 15 in synchronism with the antenna 11. Thus, the phase of the deflection coil 15 is adjusted into alignment with the phase of the antenna 11. After these two rotating elements rotate almost one revolution, the heading signal generator 62 first generates the heading signal 73 which causes the production of the synchronizing pulse 74. The stop pulse 75 is infallibly produced during the period the synchronizing signal 74 is maintained at a low-level, thereby supplying a pulse (waveform F of FIG. 4) to the R-S flip-flop circuit 68 for producing a low-level signal to be applied to the J-K input of the flip-flop circuit 66. The flip-flop circuit 66 produced a high-level output signal during the period the level of the signal applied to the J-K input thereof is maintained low, even when a stop pulse from the stop pulse generator 63 is supplied thereto. Therefore, once the phases of the deflection coil 15 and the antenna 11 are adjusted to align with each other, the two rotating elements continue to rotate without any stops even when the synchronization between the deflection coil 15 and the antenna 11 temporarily breaks, and the heading marker always appears at 12 o'clock position on the face of the cathode-ray tube.

Figure 4:
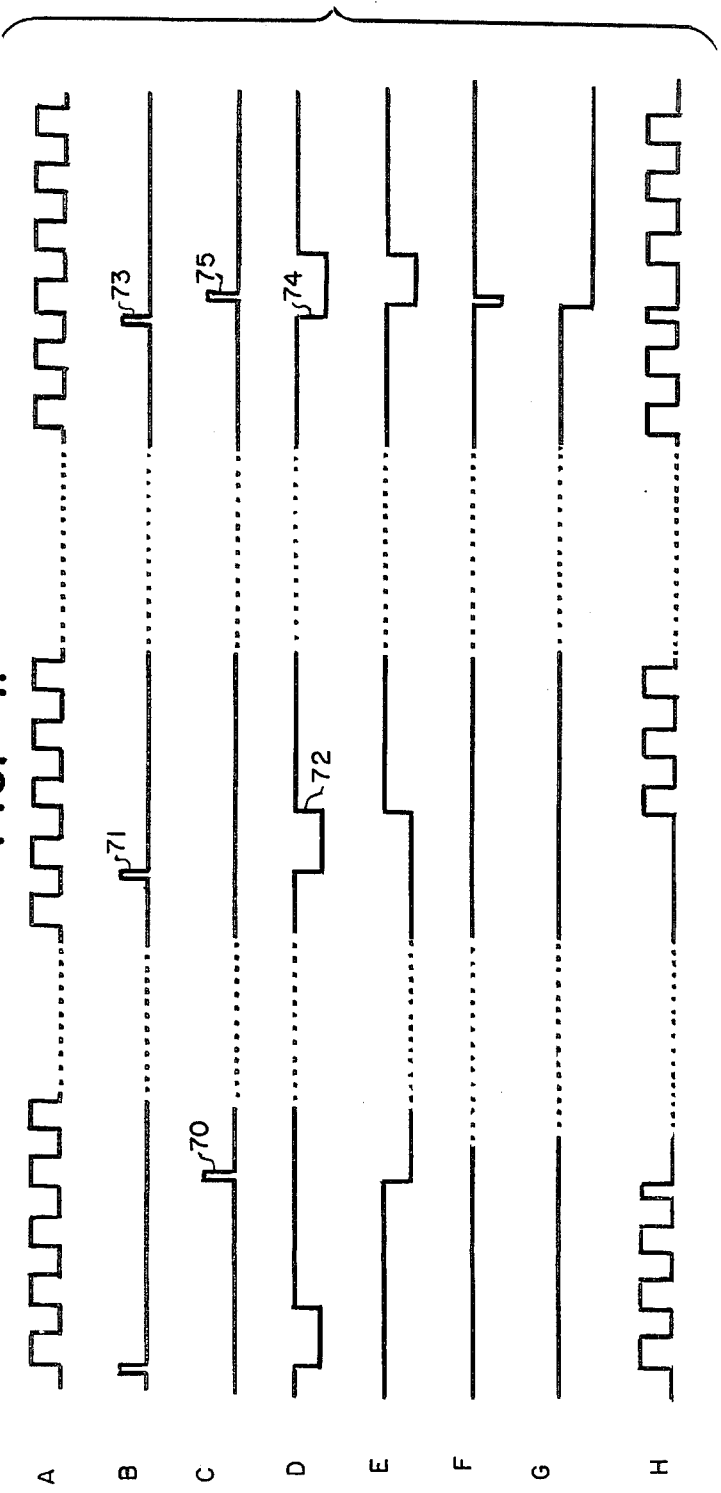
FIG. 4 is a diagrammatic representation of the signals occuring at selected points of the schematic block diagram shown in FIG. 3 for explaining the operation thereof.

It should be noted that the up-down counter 18 or the setting unit is driven by the falling edge of the signal as shown in waveform G of FIG. 4. The part 30 enclosed by dot-dash lines in FIG. 2 is interposed between the gate 64 and the pulse motor 16 in FIG. 3 as represented by dot-dash lines. If a relative display in "Ship's head up" is selected, the sequence of pulses with its frequency f (waveform H of FIG. 4) are supplied to the pulse motor 16 under the control of the switch 29.

Figure 5:
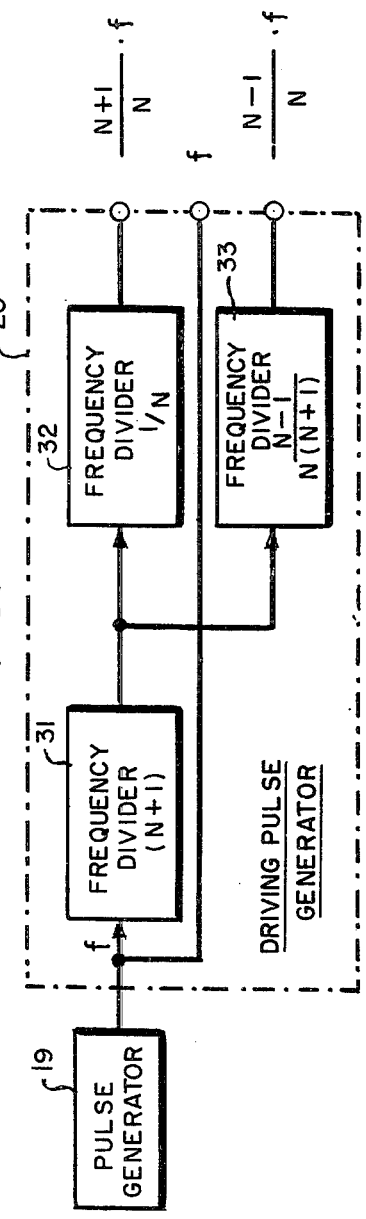
FIG. 5 is a schematic block diagram of the driving pulse generator used in the embodiment of the present invention illustrated in FIG. 2.

Referring to FIG. 5, the driving pulse generator 20 may comprise three frequency dividers 31, 32 and 33 respectively dividing the frequency of input signals by $(N+1)$, $(1/N)$ and $\{N-1\}/\{N(N+1)\}$. The output signal with a frequency f from the pulse generator 19 is respectively supplied to an output terminal and to the input of the frequency divider 31 which produces an output signal with its frequency $(N+1)f$ to the respective frequency dividers 32 and 33. The frequency divider 32 divides the input signal by $(1/N)$ to produce an output signal with its frequency $(N+1)/N \cdot f$ to an output terminal. Similarly, the frequency divider 33 divides the input signal by $\{N-1\}/\{N(N+1)\}$ to produce an output signal with its frequency $(N-1)/N \cdot f$. These output signals are all supplied to the selection gate 22.

Figure 6:
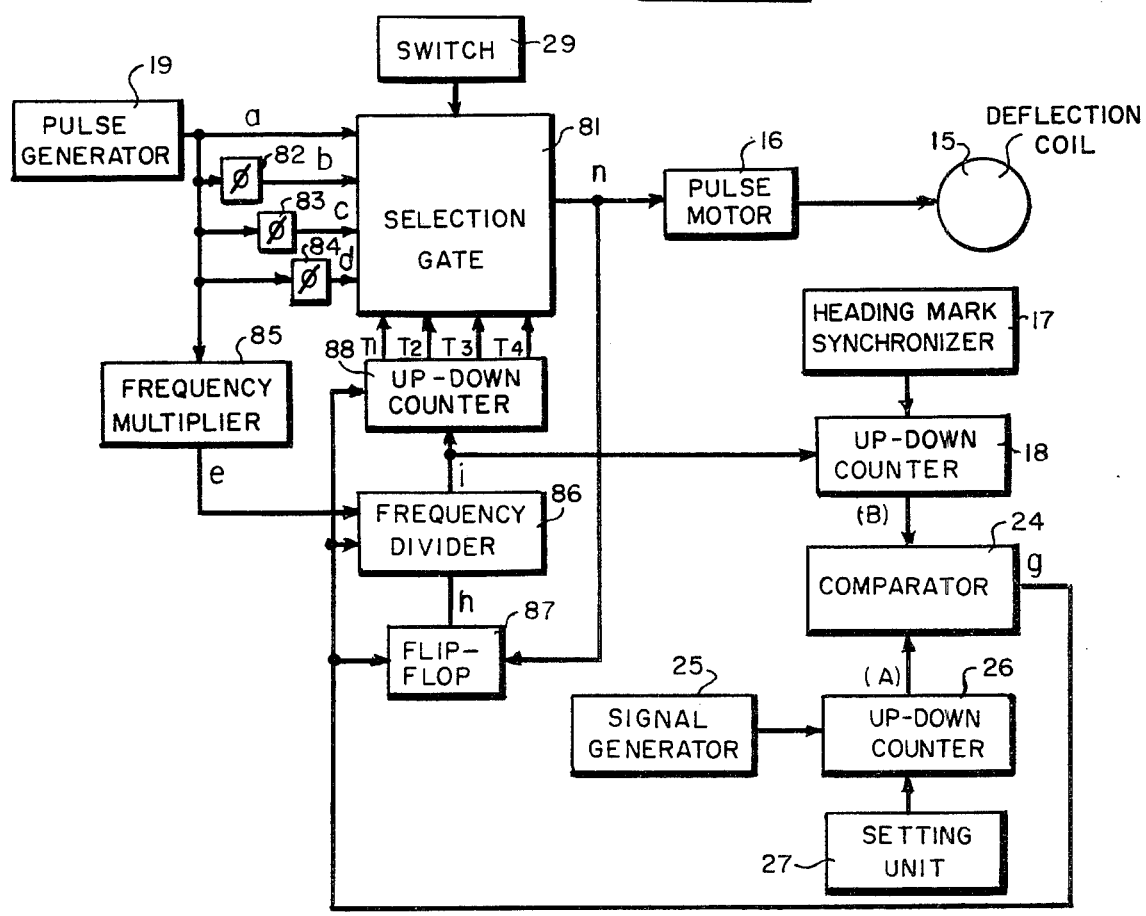
FIG. 6 is a schematic block diagram of a variation of a portion of the indicating apparatus of a radar system of FIG. 2 according to another embodiment of the present invention.
Figure 7:
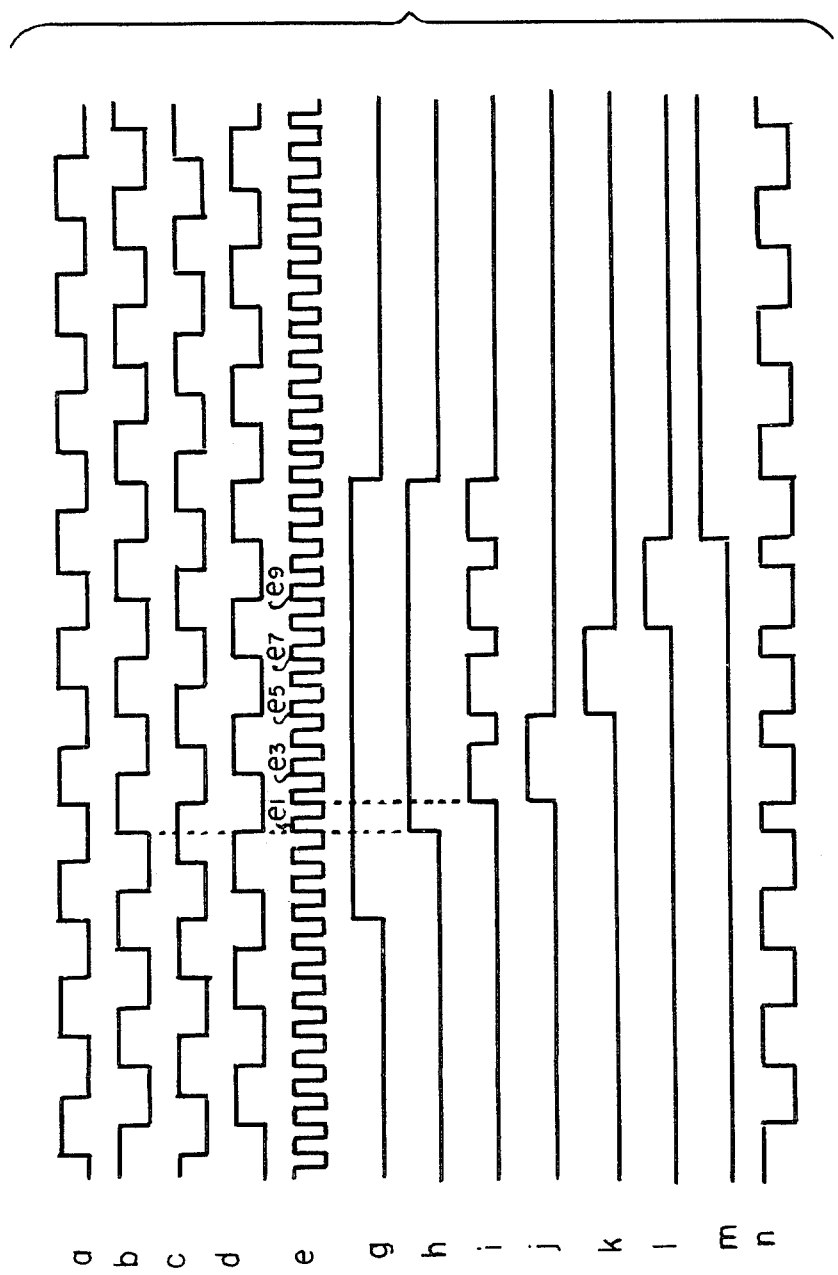
FIG. 7 is a diagrammatic representation of the signals occuring at selected points of the schematic block diagram shown in FIG. 6 for explaining the operation thereof.

Referring to FIG. 6 and FIG. 7, the pulse generator 19 supplies a sequence of pulses (waveform a of FIG. 7) respectively to one input of a selection gate 81, a phase shifter 82, a phase shifter 83, a phase shifter 84 and a frequency multiplier 85. The phase shifter 82 functions to advance the phase of the sequence of pulses from the pulse generator 19 by $\pi/2$ radians and supplies resultant signals (waveform b of FIG. 7) to an input of the selection gate 81. The phase shifter 83 advances the phase of the sequence of pulses (waveform a of FIG. 7) by $\pi$ radians and supplies obtained signals (FIG. 7c) to an input of the selection gate 81. Similarly, the phase shifter 84 advances the phase of the sequence of pulses by $3/2\pi$ radians and supplies a resultant sequence of pulses (wavefrom d of FIG. 7) to an input of the selection gate 81. The frequency multiplier 85 multiplies in frequency the input signal by four and produces resultant signals (waveform e of FIG. 7) to the clock input of a frequency divider 86. The comparator 24 produces a high-level output signal (waveform g of FIG. 7) if the result of the comparison performed therein becomes $A>B$ or $A<B$, and supplies it to the reset input of a R-S flip-flop circuit 87, to the selection input of the frequency divider 86 and to the control input of an up-down shift counter 88. The R-S flip-flop circuit 87 is set by a rising edge of an output pulse, for example waveform b of FIG. 7 from the selection gate 81 produced during the period a high-level signal (waveform g of FIG. 7) is applied thereto, so that a high-level output signal (waveform h of FIG. 7) is supplied to an input of the frequency divider 86. The flip-flop circuit 87 is reset by a falling edge of the output signal from the comparator 24 (waveform g of FIG. 7) to produce a low-level output signal to the frequency divider 86. The frequency divider 86 divides the frequency of the sequence of pulses (waveform e of FIG. 7) from the frequency multiplier 85 by three if the relationship is $A>B$. The frequency divider functions in such a way that is becomes operative at the moment the high-level signal (waveform h of FIG. 7) is applied thereto and produces an output signal (waveform i of FIG. 7) which rises when a second pulse e2 is applied and falls when a fourth pulse e4 is applied thereto, and similarly produces another output signal which respectively rises and falls at the moment a fifth pulse e5 and a seventh pulse e7 are applied thereto, thus dividing the frequency of the sequence of pulses (waveform e of FIG. 7) by three to produce output pulses (waveform i of FIG. 7). The output pulses (FIG. 7i) are supplied to the count input of the up-down counter 18 and to the count input of the up-down shift counter 88. The up-down shift counter 88 functions to produce each of the output signals (waveforms j, k, l of FIG. 7) at each of the output terminals thereof T1, T2, T3 and T4 in the order of T2, T3, T4, T1, T2 . . . each time an output signal (waveform i of FIG. 7) is applied thereto, during the period the resulting relationship of the comparision performed in the comparator 24 is $A>B$. It is here assumed that the up-down shift counter 88 first produces an output signal at the output terminal T2 thereof. Then the up-down shift counter 88 produces the output signal (waveform j of FIG. 7) at the output terminal T3 thereof when an input signal (waveform i of FIG. 7) is applied thereto from the frequency divider 86, and produces the output signal (waveform k of FIG. 7) at the output terminal T4 when the next input signal (waveform i of FIG. 7) is applied, and similarly produces the output signal (waveform 1 of FIG. 7) at the terminal T1 with no output signals at the other output terminals T2,T3 and T4 when the next input signal is applied thereto. The output signals (waveform i of FIG. 7) are also supplied to the count input of the up-down counter 18 and used as counting pulses thereof. The selection gate 81 functions to pass the sequence of pulses (waveform b of FIG. 7), while the output signal of the up-down shift counter 88 appears at the terminal T2 thereof, to the set input of the R-S flip-flop circuit 87 and to the pulse motor 16. The selection gate 81 passes the sequence of pulses (waveform e of FIG. 7) while the output signal (waveform j of FIG. 7) appears at the terminal T3 of the counter 88, and similarly passes the sequence of pulses (waveform d of FIG. 7) during the period the output signal (waveform k of FIG. 7) appears at the terminal T4. When the relationship $A=B$ is reached and the output signal (waveform m of FIG. 7) appears at the terminal T2, the selection gate 81 continuously passes the sequence of pulses (waveform b of FIG. 7). As a result, the sequence of pulses (waveform n of FIG. 7) is supplied to the pulse motor 16 and the R-S flip-flop circuit 87.

If the resulting relationship of the comparison performed in the comparator 24 is A<B, the frequency divider 86 functions to divide the frequency of the train of pulses (waveform e of FIG. 7) by five, and causes the up-down shift counter 88 to produce in turn output signals at each of the output terminals T1, T2, T3 and T4 in the order of T2, T1, T4, T3, T2, T1 . . . . Hence, the selection gate 81 selectively passes in turn one pulse of each one of the sequences of pulses (waveforms a, b, c, d of FIG. 7) in synchronization with each shift of an output signal to the next output terminal, thereby producing a sequence of pulses of lower frequency than that of the train of pulses (waveform a of FIG. 7) from the pulse generator 19 and thus decreasing the rotating speed of the deflection coil 15 and moving the heading marker in a counter-clockwise direction. The switch 29 controls the selection gate 81 to pass the train of pulses (waveform a of FIG. 7) while a relative display in "Ship's head up" is selected.

In operation, it is first assumed that the ship proceeds with a true bearing of the north as shown in FIG. 1(A). The up-down counter 26 is set to store a predetermined numerical value of zero by means of the initial value setting unit 27. Then the heading mark synchronizer 17 transmits a setting signal to the up-down counter 18 to set a numerical value of zero thereinto when the deflection coil 15 coincides in phase with the antenna 11, and thus the heading marker is indicated at 12 o'clock position on the face of the PPI indicator. Under this situation, the relationship of comparison becomes A=B, and no output signals are supplied to the R-S flip-flop circuit 87, the frequency divider 86 and the up-down shift counter 88, and the sequence of pulses (waveform b of FIG. 7) from the phase shifter 82 are by way of example supplied through the gate 81 to the pulse motor 16. Thus, the deflection coil 15 is rotated in synchronism with the rotation of the antenna 11 and the heading marker always appears at 12 o'clock position on the face of the CRT.

Now, turning the ship's head to the right by one degree, the numerical value stored in the up-down counter 26 is increased by way of example to four. The relationship of comparison becomes A>B, and so a high-level output signal (waveform g of FIG. 7) is supplied to the flip-flop circuit 87, the frequency divider 86 and the up-down shift counter 88. A driving pulse of the pulse train (waveform b of FIG. 7) from the phase shifter 82 is first supplied to the pulse motor 16. Then, the first output signal from the frequency divider 86 is supplied to the up-down counter 18 to increase the numerical value stored therein to one and also to the up-down shift counter 88 causing it to produce the output signal (waveform g of FIG. 7) at the terminal T3 thereof. The selection gate 81 selects an output pulse from the phase shifter 83 to be passed to the pulse motor 16. The output pulse from the phase shifter 83 increases the rotating speed of the pulse motor 16 and advances the phase of the deflection coil 15 by $\frac{1}{4}$ degree with respect to that of the antenna 11. Then the second counting pulse (waveform i of FIG. 7) is supplied to the up-down counter 18 to increase the numerical value to two, and also to the up-down shift counter 88 causing it to produce the output signal (waveform k of FIG. 7) at the terminal T4 thereof. An output pulse from the phase shifter 84 is selected and supplied to the pulse motor 16, thereby advancing the phase of the deflection coil 15 further by $\frac{1}{4}$ degree with respect to that of the antenna 11. Similarly, the output signals (waveform i of FIG. 7) from the frequency divider 86 are successively supplied to the up-down counter 18 and the up-down shift counter 88. When the fourth counting pulse (waveform i of FIG. 7) is respectively transmitted to the up-down shift counter 88 and to the up-down counter 18, the selection gate 81 passes a driving pulse from the phase shifter 82, thereby advancing the phase of the deflection coil totally by one degree and hence the relationship of comparison becomes A=B, since the numerical value stored in the up-down counter 18 is increased to four. Afterwards, the sequence of pulses (waveform b of FIG. 7) from the phase shifter 82 is continuously supplied to the pulse motor 16, with the result that the heading marker has moved to the right by one degree and the deflection coil 15 keeps rotating in synchronism with the rotation of the antenna 11.

In the same manner, the phase difference between the deflection coil 15 and the antenna 11 is appropriately controlled to vary and the heading marker is moved to a directed position with the change of the ship's course by degrees other than one as in the above case. In almost the same way, the heading marker is controlled to move in a counter-clockwise direction following the change of the ship's course to the left.

As easily anticipated, with the embodiment of the present invention as illustrated in FIG. 6, the indicating apparatus can have an improved resolution by moving the heading marker much more exactly to a predetermined direction.

While the invention has been described in detail and with reference to specific embodiments thereof, it will be apparent to one skilled in the art that various changes and modifications can be made therein without departing from the spirit and scope thereof.

What is claimed is:

1. An indicating apparatus of a detection system which displays on the face of a cathode-ray tube,. echo signals caused by search pulses transmitted successively in different directions from a transmitting and receiving unit rotated at constant speed and returned from obstacles, and a mark signal produced when the transmitting and receiving unit points in a predetermined direction, thereby displaying an image of the surrounding area and a radial reference marker thereover in a form of plan position indication, comprising:
   (i) deflecting means mounted around the neck of the cathode-ray tube for rotation about an axis thereof, for deflecting the electron beam thereof,
   (ii) a rotating shaft for rotating the transmitting and receiving unit in a horizontal plane at constant speed,
   (iii) phase aligning means for aligning the phase of said deflecting means with that of said rotating shaft and for producing an output signal when said deflecting means and rotating shaft are aligned with one another,
   (iv) a pulse motor for rotating said deflecting means,
   (v) pulse generating means for producing a sequence of pulses in dependence upon the rotation of said rotating shaft,
   (vi) first comparison signal generating means for storing a predetermined numerical value corresponding to the angle between a ship's heading direction and a reference bearing for producing a resulting value obtained by an addition or substraction operation performed with the change of the ship's course, (vii) second comparison signal generating means for storing a specific numerical value set thereinto by the output signal supplied from said phase aligning means for producing a resulting value obtained by an addition or subtraction operation performed based on the sequence of pulses supplied from said pulse generating means, (viii) comparing means for comparing the output values from said first and second comparision signal generating means with each other to produce resulting output signals, and (ix) driving pulse generating means for producing a plurality of sequences of pulses respectively with different frequencies to be used for driving said pulse motor and for selecting a sequence of pulses with a frequency based on a corresponding output signal from said comparing means and supplying them to said pulse motor.

2. An indicating apparatus of a detection system as defined in claim 1, wherein the first comparison signal generating means comprises, (i) a first up-down counter, (ii) a setting unit for setting a numerical value into said first up-down counter corresponding to the angle between the ship's heading direction and a reference bearing, and (iii) signal generating means for producing pulses in proportion to the degree of the change of the ship's course and for producing direction signals representing the direction of the change of the ship's course.

3. An indicating apparatus of a detection system as defined in claim 1, wherein the second comparision signal generating means comprises, (i) a count pulse generator for generating count pulses based on the sequence of pulses produced by said pulse generating means, and (ii) An up-down counter for storing a specific numerical value set thereinto by the output signal supplied from the phase aligning means for performing an addition or subtraction operation each time a count pulse is supplied from said count pulse generator and for producing an obtained numerical value.

4. An indicating apparatus of a detection system as defined in claim 1 or 3, wherein the driving pulse generating means comprises means for producing either one of sequences of pulses with respective frequences of f, $(N+M/)N \cdot f$ or $(N-M)/N \cdot f$ where f is the frequency of pulses produced from the pulse generating means, and the count pulse generator of the second comparison signal generating means comprises means for generating a sequence of pulses with a frequency of $1/N \cdot f$, where N and M are integers and N is larger than M.

5. An indicating apparatus of a detection system as defined in claim 1, wherein the second comparison signal generating means comprises means for storing a numerical value of zero when the output signal from the phase aligning means is applied thereto.

6. As indicating apparatus of a detection system as defined in claim 1, wherein the second comparison signal generating means comprises means for storing the same numerical value as the one stored in the first comparison signal generating means when the output signal from the phase aligning means is applied thereto.

7. An indicating apparatus of a detection system as defined in claim 1, wherein the first comparison signal generating means comprises means for continuing to store the same numerical value as the one contained therein when the indicating apparatus is disconnected from power mains.

8. An indicating apparatus of a detection system as defined in claim 1, wherein the driving pulse generating means comprises, (i) p phase shifters connected to respectively successively shift the phase of the output signals from the pulse generating means by $2\pi/p$ radians with respect to each other, wherein p in an integer, (ii) a frequency multiplier for multiplying the frequency of the output signals from the pulse generating means by p, (iii) a frequency divider dividing the frequency of the output signals from said frequency multiplier by q during the period the resulting relationship of the comparison performed in the comparing means is such that A is not equal to B, where A and B respectively represent the numerical values stored in the first and second comparison signal generating means, (iv) an up-down shift counter for performing an addition of subtraction operation based on the output signals produced from said frequency divider and for successively producing each of the output signals at each of its output terminals in the predetermined order, and (v) selecting means for passing a pulse signal from the corresponding phase shifter in dependence upon the output signal appearing at one of the output terminals of said up-down shift counter.

9. An indicating apparatus of a detection system as defined in claim 1, wherein the second comparison signal generating means comprises, (i) a frequency multiplier coupled to said pulse generating means, (ii) a frequency divider coupled to said frequency multiplier, and (iii) an up-down counter coupled to said frequency divider.

10. An indicating apparatus of a detection system as defined in claim 8 or 9, wherein the frequency divider comprises means for dividing the frequency of the output signals from the frequency multiplier by three during the period the resulting relationship of the comparison performed in the comparing means is $A > B$.

11. An indicating apparatus of a detection system as defined in claim 8 or 9, wherein the frequency divider comprises means for dividing the frequency of the output signals from the frequency multiplier by five during the time when $A < B$.

12. An indicating apparatus of a detection system as defined in claim 1, wherein, (i) said pulse generating means comprises a first pulse generating means for producing a pulse per revolution of the transmitting and receiving unit, and a second pulse generating means for producing a pulse per revolution of the deflection coil, (ii) pulse synchronizing means for synchronizing the sequence of pulses from said first pulse generating means with the pulse produced by said second pulse generating means and for producing a synchronizing pulse when they are synchronized with one another, (iii) a first gate connected to be controlled by the synchronization pulse for producing a pulse in response to the output signal from said second pulse generating means, (iv) a flip-flop circuit for producing a high-level output signal when the indicating apparatus is switched on and for producing a low-level output signal when the output signal of said first gate is applied thereto, the output signal therefrom being coupled to the second comparison signal generating means, (v) a J-K flip-flop circuit, for synchronization pulse from said pulse synchronizing means being applied to the preset terminal thereof and the output signal from said flip-flop circuit being applied to the J-K terminals thereof and the output signal from said second pulse generating means being applied to the clock terminal thereof, and (vi) a second gate connected to be controlled by the output signal from said J-K flip-flop circuit for passing the sequence of pulses from said first pulse generating means.

13. In an indication system for a vessel for displaying a heading mark and an obstacle mark in a plan position indication on a CRT, wherein the deflection system for the CRT is rotated by a motor, first means are provided for producing first signals corresponding to the rotation of an antenna of the vessel, and means are provided for producing second signals corresponding to a given rotational position of the antenna with respect to the deflection system; the improvement wherein said first means comprises a source of a pulse train, means coupling said pulse train to said motor and means responsive to said second signals coupled to synchronize the rotation of said antenna and said deflection system.

14. The indication system of claim 13, wherein said synchronizing means comprises first and second up-down counters, means setting said first counter in response to said first signals, and a true bearing respectively, and means responsive to a comparison of the counts of said counters for controlling the rotation of said motor.

15. The indication system of claim 14, wherein said means responsive to a comparison comprises means for applying selectively variable frequency pulses to the said motor.

16. The indication system of claim 14, wherein said means responsive to a comparison of the counts comprises means for varying the phase of pulse signals applied to said motor.

* * * * *